(12) United States Patent
Baker

(10) Patent No.: US 9,489,529 B2
(45) Date of Patent: Nov. 8, 2016

(54) DATA SECURITY SYSTEM

(76) Inventor: Stewart A. Baker, Great Falls, VA (US)

( * ) Notice: Subject to any disclaimer, the term of this patent is extended or adjusted under 35 U.S.C. 154(b) by 368 days.

(21) Appl. No.: 13/595,635

(22) Filed: Aug. 27, 2012

(65) Prior Publication Data

US 2013/0097696 A1    Apr. 18, 2013

Related U.S. Application Data

(60) Provisional application No. 61/627,468, filed on Oct. 13, 2011.

(51) Int. Cl.
| | |
|---|---|
| G06F 21/62 | (2013.01) |
| G06F 21/55 | (2013.01) |
| G06F 21/56 | (2013.01) |
| H04L 29/06 | (2006.01) |

(52) U.S. Cl.
CPC ......... *G06F 21/6209* (2013.01); *G06F 21/554* (2013.01); *G06F 21/56* (2013.01); *H04L 63/1441* (2013.01)

(58) Field of Classification Search
CPC .................................................. G06F 21/6209
USPC .......................................................... 726/17
See application file for complete search history.

(56) References Cited

U.S. PATENT DOCUMENTS

| | | | | |
|---|---|---|---|---|
| 3,039,582 A * | 6/1962 | Simjian | ................ | G06Q 20/341 194/211 |
| 3,339,671 A * | 9/1967 | Simjian | ................ | A47F 10/02 186/56 |
| 6,351,848 B1 * | 2/2002 | Chessin | ................ | G06F 8/441 717/140 |
| 7,712,132 B1 * | 5/2010 | Ogilvie | ................ | H04L 63/1408 726/22 |
| 7,953,984 B1 * | 5/2011 | Chung et al. | ................ | 713/188 |
| 2002/0085230 A1 * | 7/2002 | Kitahara | ................ | G06F 17/243 358/1.16 |
| 2002/0144155 A1 * | 10/2002 | Bate | ................ | G06F 21/6209 726/30 |
| 2004/0088565 A1 * | 5/2004 | Norman et al. | ................ | 713/200 |

(Continued)

OTHER PUBLICATIONS

Strunk et al.; Self-securing storage: protecting data in compromised system; Published in: Proceeding OSDI'00 Proceedings of the 4th conference on Symposium on Operating System Design & Implementation—vol. 4; Article No. 12; Year 2000; ACM Digital Library.*

(Continued)

*Primary Examiner* — Bradley Holder
(74) *Attorney, Agent, or Firm* — Kramer Amado P.C.

(57) ABSTRACT

Various exemplary embodiments relate to a method of identifying unauthorized access to a data file on an unauthorized machine. The method includes: modifying the data file to include surreptitious code, the surreptitious code executing on a machine when the data file is opened or otherwise used by the machine; and receiving information transmitted by the surreptitious code, wherein the surreptitious code includes instructions for: gathering information about the executing machine, determining whether the executing machine is an unauthorized machine, and transmitting the information if the executing machine is an unauthorized machine. Various exemplary embodiments relate to a non-transitory machine-readable storage medium, the storage medium including instructions for: executing surreptitious code when the medium is accessed by a computing device; gathering information about the computing device; determining whether the computing device is an authorized machine; and transmitting the information if the computing device is an unauthorized machine.

18 Claims, 4 Drawing Sheets

(56) References Cited

U.S. PATENT DOCUMENTS

| | | | |
|---|---|---|---|
| 2004/0117628 A1* | 6/2004 | Colvin | G06F 21/121 713/176 |
| 2004/0237045 A1* | 11/2004 | Meltzer | G06Q 10/10 715/234 |
| 2006/0101052 A1* | 5/2006 | Netrakanti | G06Q 10/00 |
| 2006/0170661 A1* | 8/2006 | Clynes | G06F 8/65 345/204 |
| 2006/0212407 A1* | 9/2006 | Lyon | 705/71 |
| 2007/0192865 A1* | 8/2007 | Mackin | H04L 63/1441 726/24 |
| 2009/0328227 A1* | 12/2009 | Cook | G06F 21/121 726/26 |
| 2010/0077483 A1 | 3/2010 | Stolfo et al. | |

OTHER PUBLICATIONS

Tomonori et al.; Protecting the integrity of an entire file system; Published in: Information Assurance, 2003. IWIAS 2003. Proceedings. First IEEE International Workshop on; Date of Conference: Mar. 24-24, 2003; pp. 95-105; IEEE Xplore.*

* cited by examiner

DATA SECURITY SYSTEM

CROSS-REFERENCE TO RELATED APPLICATIONS

This application claims the benefit of U.S. Provisional Application No. 61/627,468 filed on Oct. 13, 2011, the entire disclosure of which is incorporated herein by reference.

TECHNICAL FIELD

Various exemplary embodiments disclosed herein relate generally to computer security.

BACKGROUND

More and more information that is stored digitally on computers and other machines is confidential. The information is made available only to certain persons, often with restrictions on where the information can be accessed and whether it may be copied or moved to other machines. But users sometimes fail to observe these restrictions, either because authorized users choose to disobey the restrictions or because unauthorized users have gained access to the machine that holds the restricted information.

SUMMARY

In light of the present need for computer security mechanisms to protect confidential information a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method of identifying unauthorized access to a data file on an authorized or unauthorized machine. The method includes: modifying the data file to include surreptitious code, the surreptitious code executing on a machine when the data file is opened or otherwise used by the machine; and receiving information transmitted by the surreptitious code, wherein the surreptitious code includes instructions for: gathering information about the executing machine, determining whether the executing machine is an unauthorized machine, and transmitting the information if the executing machine is an unauthorized machine.

In various embodiments, the instructions for gathering information include at least one of instructions for intercepting signals broadcast by a wireless device in the vicinity of the executing machine; instructions for taking a picture using a camera of the executing machine; instructions for taking a voice sample using a microphone of the executing machine; instructions for copying a digital fingerprint used to access the executing machine; and instructions for gathering information relating to the characteristics or activities of the executing machine.

In various embodiments, the instructions for determining whether the data file is on an unauthorized machine include instructions for comparing the gathered information to a set of parameters identifying authorized users.

In various embodiments, the method further includes determining parameters defining authorized users of the data file and including the parameters within the surreptitious code.

In various embodiments, the surreptitious code further includes instructions for concealing or protecting copies or versions of the surreptitious code on the unauthorized machine. The instructions for concealing or protecting copies or versions of the surreptitious code include at least one of: instructions for renaming files; instructions for using existing code already installed on the unathorized machine to carry out some or all of the functions of the surreptitious code; instructions for avoiding operating system audits, and instructions for generating multiple mutually supporting programs such that the deletion of one triggers an additional program that continues to perform the security functions of the surreptitious code.

In various embodiments, the method further includes obtaining the consent of a user of the data file to access and modify data on any machine accessing the data file.

In various embodiments, the method further includes determining, based on the received information, whether the executing machine is authorized to access the data file.

In various embodiments, the method further includes sending a command to the unauthorized machine, wherein the surreptitious code includes instructions for receiving the command and executing the command on the unauthorized machine. The command include instructions for disabling or suspending operation of the surreptitious code temporarily or permanently. The instructions for receiving the command include instructions for analyzing a unique credential that authenticates the command as sent from an authorized command authority. The authorized command authority is one of the management of a security authority, a government agency, and a court.

In various embodiments, the instructions for transmitting the information include instructions for including the information in a query sent to a search engine, a DNS server, or other common Internet transmission.

In various embodiments, the instructions for transmitting the information include instructions for modifying a communication of the unauthorized machine to include the information.

In various embodiments, the instructions for transmitting the information include instructions for copying the information and the surreptitious code to a secondary device.

In various embodiments, the instructions for gathering information include: determining whether collected information satisfies conditions for an exception, and excluding the collected information from the transmitted information if it satisfies the conditions.

In various embodiments, the surreptitious code includes a unique credential that identifies an instance of the surreptitious code included in the data file and the surreptitious code further includes instructions for transmitting the unique credential.

Various exemplary embodiments relate to a non-transitory machine-readable storage medium encoded with instructions executable by a processor, the non-transitory machine-readable storage medium including: instructions for modifying a data file to include surreptitious code, the surreptitious code executing when the data file is opened or otherwise used, the surreptitious code including instructions for: gathering information about the executing machine, determining whether the data file is on an unauthorized machine, and transmitting the information; and instructions for receiving the information transmitted by the surreptitious code.

Various exemplary embodiments relate to a non-transitory machine-readable storage medium encoded with instructions executable by a processor, the non-transitory machine-readable storage medium including: instructions for executing surreptitious code when the non-transitory machine-readable storage medium is accessed by a computing device; instructions for gathering information about the computing device; instructions for determining whether the computing device is an authorized machine; and instructions for transmitting the information.

It should be apparent that, in this manner, various exemplary embodiments provide for a computer security mechanism for securing data files. In particular, by embedding surreptitious code within a data file, the data file may be tracked across both authorized and unauthorized machines.

BRIEF DESCRIPTION OF THE DRAWINGS

In order to better understand various exemplary embodiments, reference is made to the accompanying drawings, wherein.

DETAILED DESCRIPTION

Figure 1:
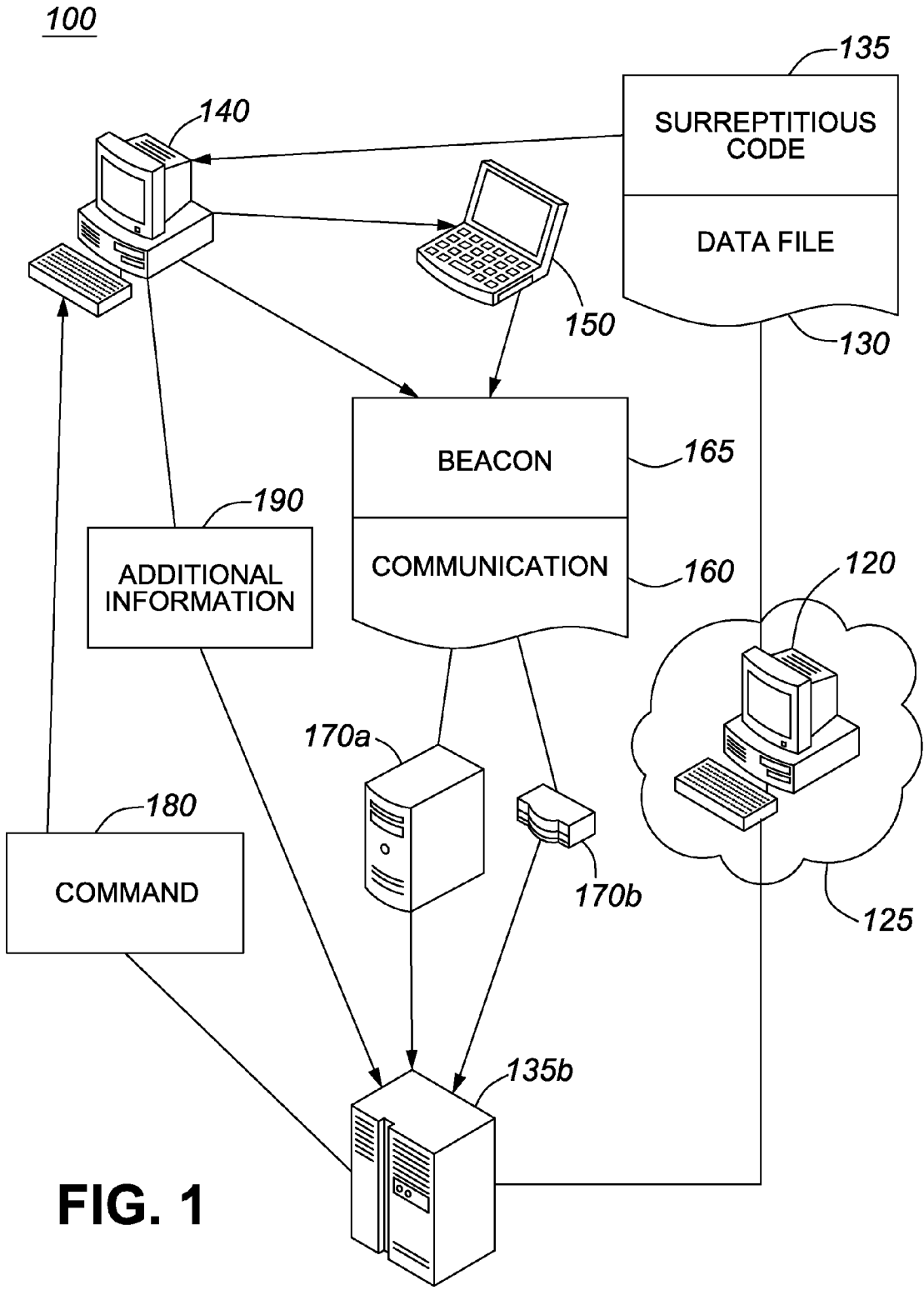
FIG. 1 illustrates an exemplary computing environment providing information to a security authority.

Referring now to the drawings, in which like numerals refer to like components or steps, there are disclosed broad aspects of various exemplary embodiments.

FIG. 1 illustrates an exemplary computing environment 100 providing information to a security authority 110. Exemplary computing environment 100 may include security authority 110, authorized machine 120, unauthorized machine 140, secondary device 150, and receiving machines 170. Computing environment 100 may store and/or transmit data such as data file 130, surreptitious code 135, communication 160, beacon 165, and command 180.

Security authority 110 may include one or more computing devices that receive information transmitted as a result of the functioning of surreptitious code and that transmit instructions to be executed by surreptitious code on machines holding a data file. Security authority 110 may provide additional security functions for authorized devices 120. For example, security authority 110 may secure data files for a commercial enterprise or a government agency. In various embodiments, security authority 110 may include different devices or machines for performing different security functions. For example, security authority 110 may include a file modifier, an access logger, and a command issuer. Security authority 110 may modify a data file to include an instance of surreptitious code. The security authority 110 may provide the modified data file to authorized machine 120 for storage and access by authorized users.

Authorized machine 120 may be any computing device that generates, stores, or accesses data files. For example, authorized machine 120 may be a desktop, laptop, or tablet computer, a mobile device, cell phone, PDA, smart phone, server, or any other device capable of accessing a data file. In particular, authorized machine 120 may be a device that has been authorized by security authority 110 to access secured data files. Authorized machine 120 may cooperate with security authority 110 for securing data files. For example, authorized machine 120 may provide data files to security authority 110 for modification. In various embodiments, all data files on authorized machine 120 may be modified. Alternatively, only data files meeting certain criteria such as, for example, a specified security level may be modified. Authorized machine 120 may require authentication of all users and control access of users to data files. Authorized machine 120 may seek consent of users to security functions such as monitoring the user and the data files on any device. Authorized machine 120 may also provide information regarding modified files, such as access logs, to security authority 110 or allow surreptitious code embedded within data files to transmit information to security authority 110.

Authorized network 125 may be a network or computing environment that is authorized by security authority 110 for accessing secured data files. Authorized network 125 may include security and user authentication limiting access and use of secured data files. If an authorized machine 120 leaves authorized network 125 or connects to another network, the authorized machine 120 may become an unauthorized machine 140. Alternatively, a machine external to the authorized network may gain access to the authorized network 125 by impersonating an authorized machine and thereby constituting an unauthorized machine 140. Similarly, a machine may become an unauthorized machine by receiving a secured data file that has been removed from the authorized network without authority or in excess of authority.

Data file 130 may be a data or executable file that has been modified by security authority 110 to include surreptitious code 135. Data file 130 may be any data file that the owner or authorized user wants to secure. For example, data file 130 may include text documents, spreadsheets, presentations, audio, video, databases, or any other type of data file. Data file 130 may be stored in any known format for the type of data file.

Surreptitious code 135 may include instructions that are executed by a processor when data file 130 is accessed. Surreptitious code 135 may include code that operates in the background, without the knowledge or control of a user and whose execution is not easily detected or prevented by the user of the machine. To operate successfully in the background, the surreptitious code may take advantage of security flaws or other features in commercial programs including operating systems and applications. Surreptitious code 135 may seek authorization from the user by presenting the authorization in terms that make an affirmative response likely without revealing the security goals the code will serve. In order to maintain an ability to meet security goals, the code may modify program, operating system, or BIOS code in a fashion that conceals or disguises the code and its operation from the unauthorized user. Concealment may include specific methods such as renaming files, avoiding operating system audits, and using multiple, mutually supporting programs such that deletion of one triggers a second or third program that can continue to perform the security functions. Other mechanisms may include modification of the application's code with the consent of the licensor of the application for purposes of supporting the security system. The surreptitious code may operate in such a way as to minimize harm to the unauthorized user's machine.

Each instance of surreptitious code 135 may include a unique credential that identifies the instance of surreptitious code. The unique credential or a portion of the credential or a cryptographic hash of the credential may be included in communications generated by surreptitious code 135 such as beacon 165. The unique credential may be a unique sequence of bits incorporated into the code. The unique credential may have internal secret consistencies, such as checksums of arbitrary portions of the other parts of the sequence, to make it difficult for unauthorized parties to imitate or forge messages transmitted by the surreptitious code, or to transmit messages falsely suggesting that the data file has been opened on a machine other than the one on which the data file has actually been opened. In various embodiments, the surreptitious code 135 may be provided with one-half of a unique cryptographic public key pair with which to sign or encrypt portions of the beacon signal in a fashion that verifies the unique credentials incorporated into the surreptitious code and also disguises the identifying data transmitted in the beacon signal. Unique credentials associated with each instance of surreptitious code 135 allow an independent party, including the data file's owner, a court or a government agency, to verify that surreptitious code is being deployed in accordance with law or the instructions issued by the data file owner. Unique credentials thus may allow auditing of deployments so that, for example, misuse of the surreptitious code by a security authority may be identified or deterred. Additionally, unique credentials may allow identification of the individual file or other data that has been accessed by an unauthorized user without the need for transmission of other information such as the file name, which may alert the user or operating system of unauthorized device 140 that the file is protected. The unique credentials may be used for purposes of identifying each time a file is accessed or opened even by an authorized user. In that instance, the unique identifier and the time and date of any message sent by the surreptitious code may be recorded in an access log along with information about the accessing machine. The access log may be stored securely outside the authorized network 125 and thus may be less easily modified by persons with network authority, who may be inside attackers. The access log would thus remain available for inspection even after the surreptitious code has ceased to transmit messages.

Unauthorized machine 140 may be any computing device that generates, stores, or accesses data files. For example, unauthorized machine 140 may be a desktop, laptop, or tablet computer, a mobile device, cell phone, PDA, smart phone, server, or any other device capable of accessing a data file. In particular, unauthorized machine 140 may be a device that does not have permission from security authority 110 to access a secured data file. An unauthorized machine may also include an authorized machine 120 that is operating outside of security requirements. For example, an authorized machine 120 that is removed from a secured area, accesses an unsecured network, or is accessed by an unauthorized user may become an unauthorized machine. Unauthorized machine 140 may gain access to modified data file 130 including surreptitious code 135. Unauthorized machine 140 may execute surreptitious code 135 when attempting to access data file 130. The surreptitious code 135 may perform various security functions while executing on unauthorized machine 140.

Secondary device 150 may be any computing device that generates, stores, or accesses data files. For example, secondary device 150 may be a desktop, laptop, or tablet computer, a mobile device, cell phone, PDA, smart phone, server, or any other device capable of accessing a data file. Secondary device 150 may be a device that has come into contact with unauthorized machine 140. Surreptitious code 135 may copy itself onto a secondary device 150 and execute. Secondary device 150 may not have direct access to data file 130, so as not to be an unauthorized machine. For example, secondary device 150 may have used the same portable storage device, such as a flash drive, as unauthorized machine 140.

Communication 160 may be data, a signal, packet, or other information sent from an unauthorized machine 140 or secondary device 150. Communication 160 may be an intended communication of a user of the sending device or may be a communication generated by surreptitious code 135. Communication 160 may include beacon 165.

Beacon 165 may include information collected by surreptitious code 165 and intended for eventual receipt by security authority 110. Beacon 165 may be hidden within communication 160 such that the user or operating system of the sending device does not detect beacon 165. The beacon 165 may include minimal information necessary to identify the location, both geographical and digital, of the unauthorized machine 140. In various alternative embodiments, the beacons may contain a larger amount of information sufficient to identify the user, based on usage patterns, social media, or biometrics such as voice samples or photos extracted from the unauthorized machine 140 by the surreptitious code 135. Accordingly, the beacon may contain information sufficient to identify the unauthorized machine and its user. This information may be spread over multiple instances of the beacon and reassembled by the security authority to acquire the complete message.

Receiving machines 170 may include any device that receives communication 160. Receiving machines 170 may be configured to forward beacon 165 to security authority 110. Receiving machines 170 may make the beacon 165 available to security authority 110 through other intermediary machines. The receiving machines 170 may include telephones, fax machines, internet or network servers or routers, or any other mechanisms so long as they are capable of receiving and accessing signals sent by unauthorized machine 170. Receiving machines 170 may be controlled by the security authority 110, a party acting in concert with security authority 110, or a third party that is unaware that a receiving machine 170 is performing this function. Some receiving machines 170 may be managed by persons or entities independent of the security authority 110 and authorized network 125. Such receiving machines 170 may be useful for securely storing auditing information for auditing use of surreptitious code 135.

Receiving machines 170 may be in communication with various networks in order to receive communication 160 with beacon 165. For example, receiving machines 170 may be connected to private networks, such as a network controlled by the security authority 110 or authorized machine 120, or public networks such as the Internet, wireless networks, or mobile networks. For example, receiving machine 170 may include a search engine or DNS server that identifies beacon 165 hidden within a query and forwards the beacon 165 to security authority 110. As another example, receiving machine 170 may be a router or switch that processes large volumes of traffic. The number and location of receiving machines can be varied to increase the likelihood of receiving a communication including a beacon 165. The number and location of the receiving machines may also be varied so that unauthorized machines or networks cannot easily determine that surreptitious code is sending signals and cannot block the signals by blocking or searching for signals sent to particular locations, addresses, or phone numbers.

Command 180 may be an instruction sent from security authority 110 to unauthorized machine 140. Command 180 may be sent directly or through one or more receiving machines. Surreptitious code 135 executing on unauthorized machine 140 may include instructions for processing command 180 to fulfill various security functions. For example, command 180 may instruct surreptitious code 135 to send additional information 190 to security authority 110. Additional information 190 may include any data gathered by surreptitious code 135 that was not included in beacon 165. For example, additional information 190 may include photographs or other large files.

Figure 2:
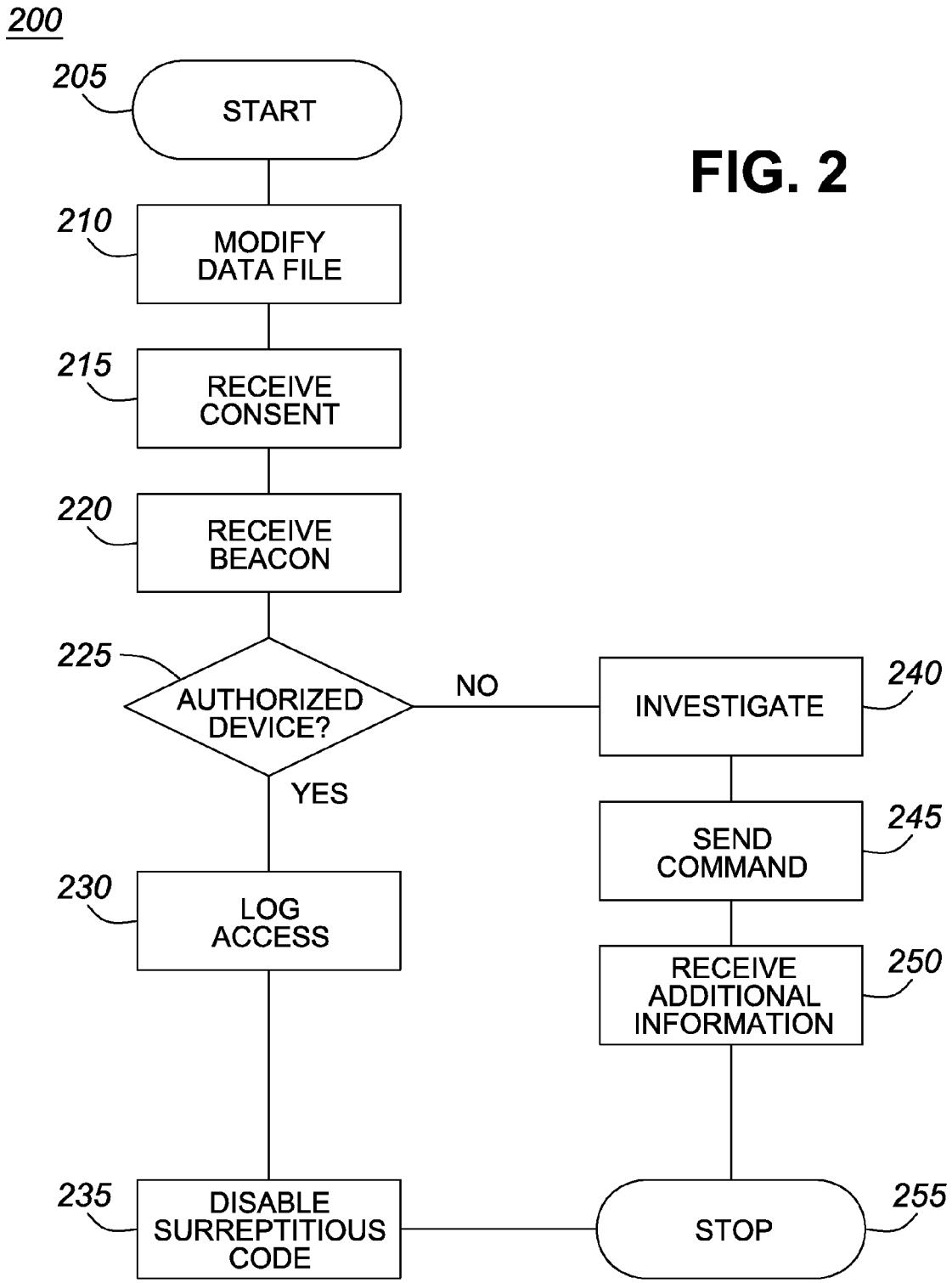
FIG. 2 illustrates a flowchart showing an exemplary method of identifying unauthorized access to a data file.

FIG. 2 illustrates a flowchart showing an exemplary method 200 of identifying unauthorized access to a data file. The method 200 may be performed by the various components of security authority 110 and/or authorized machine 120. The method 200 may begin at step 205 and proceed to step 210.

In step 210, security authority 110 may modify data file 130 to include surreptitious code 135. The surreptitious code 135 may be affixed or incorporated into files, programs, or other digital data stored on systems that the security authority 110 has authority to secure. In various embodiments, security authority 110 may receive data file 130 from an authorized machine 120 and embed the surreptitious code in the received file. In various alternative embodiments, security authority 110 may provide an authorized machine 120 with instructions for embedding surreptitious code in a data file 130. Security authority 110 may assign a unique credential to the surreptitious code when it is embedded in a data file 130. Security authority 110 may maintain a log of all unique credentials and activity associated with each credential. The method 200 may proceed to step 215.

In step 215, security authority 110 may receive consent from a user of the authorized machine 120 or unauthorized machine 140. Authorized machine 120 may present a user with a consent form requiring the user to consent to various security functions in order to use authorized machine 120 or to access data file 130. In particular, the consent form may require the user to consent to being monitored on any device used to access data file 130. The consent form may include consent to additional security functions including collection of data, installation of software, transmission of data, and any other consent necessary to comply with applicable laws. Security authority 110 and/or authorized machine 120 may then allow access to the secured data file 130.

The consent forms may be presented in the form of terms of use notices or dialogue boxes containing a requirement that a party using a network or opening a file or otherwise accessing data protected by the security authority consent to the security authority accessing and modifying data on any machine opening or accessing protected data. Consent may be inferred from continuing to use the network or to access the data, or it may be evidenced by a voluntary acknowledgment of consent by the accessing part, e.g., by checking an accept button in a dialogue box. These consent mechanisms may build on existing consent and notice mechanisms designed for other purposes by commercial parties, including standard terms of use, or licenses for websites, software, and hardware. Such consent mechanisms may be deployed as a security measure on systems or data files that are not in fact protected by surreptitious code, both to deter unauthorized access and to complicate the process of exploiting unauthorized access.

In step 220, security authority 110 may wait to receive a beacon from surreptitious code. In various embodiments, security authority 110 may receive a beacon 165 from surreptitious code executing on both authorized and unauthorized machines. Security authority 110 may receive the beacon 165 indirectly from a receiving machine 170.

In step 225, security authority 110 may determine whether a received beacon was sent by an authorized machine or an unauthorized machine. In various embodiments, surreptitious code 135 may include instructions for determining whether the executing machine and the accessing user are authorized. In such embodiments, the beacon 165 may include an indication of the type of machine and user accessing the data file. In various embodiments, beacon 165 may include information about the machine and user collected by the surreptitious code. In such embodiments, security authority 110 may compare the received information with security information such as access control lists to determine whether the beacon is from an authorized or unauthorized machine and user. If the beacon is from an authorized machine, the method 200 may proceed to step 230. If the beacon is from an unauthorized machine, the method 200 may proceed to step 240.

In step 230, the security authority 110 may log the access of the authorized machine and user to the secured data file. The security authority may maintain an access log for each data file. The access log may be useful for determining how an unauthorized user or machine gains access. In step 235, the security authority 110 may disable the surreptitious code. The security authority 110 may send a command 180 to the surreptitious code. The command 180 may prevent the surreptitious code from performing further security functions such as collecting information about the authorized user or may completely disable the surreptitious code. The method 200 may then proceed to step 260, where the method 200 ends.

In step 240, the security authority 110 may investigate an unauthorized access to the data file. Security authority 110 may use information provided in the beacon to locate the unauthorized machine 140. If the identifying data is sufficient to establish the location of the unauthorized machine, and the security authority has direct access to the unauthorized machine, the security authority may seize or otherwise directly access the machine to conduct an investigation. Security authority 110 may also analyze access logs to determine how and when the unauthorized machine 140 gained access to the data file. When unauthorized access to the secure data file constitutes a crime or the beacon includes other evidence of a crime, the identifying data may be provided to law enforcement to assist in procuring a warrant to seize the unauthorized machine.

In step 245, the security authority 110 may send a command 180 to the unauthorized machine. If the unauthorized machine 140 cannot be directly accessed by the security authority 100, commands may be used to investigate the unauthorized machine. The command 180 may include instructions to be performed by the surreptitious code 135 or the unauthorized machine 140. For example, the command 180 may instruct surreptitious code 135 to gather or send additional information from unauthorized machine 140. As another example, the command 180 may instruct surreptitious code 135 to install additional code on unauthorized machine 140 or delete or otherwise alter the data file 130. In many cases, the investigative activities and commands may take place in cooperation with or under the authority of law enforcement agencies or courts.

Commands 180 sent to surreptitious code 135 operating on unauthorized machine 140 may be unique to the security authority 110 in a fashion verifiable by the surreptitious code 135. Accordingly, the surreptitious code 135 may be provided with a mechanism for checking unique credentials available to the security authority. For example, the unique credential of the security authority may include a private key. The private key may be used to sign commands 180 or a portion of commands sent by the security authority. The private key may also be used to encrypt a portion of the received beacon and include it in the command 180. The surreptitious code may then use a corresponding public key to decrypt the signed portion of the command and compare it to the beacon signal as sent, verifying the credentials of the command sender.

Unique identifiers and credentials used for deployment of surreptitious code may be different from the credentials used to send commands to the surreptitious code running on the unauthorized machine 140. Separate credentials may allow the security authority, or some other lawfully designated authority such a a law enforcement agency, to regulate, monitor, or audit each use of the command credentials. For example, the command authority may be restricted so that no change in the operation of the unauthorized machine 140 would be permitted in the absence of specific approval by higher management, a government agency, or a court. In various embodiments, such higher authorities may have their own credentials that may be used to sign commands sent to the surreptitious code 135.

In step 250, the security authority 110 may receive additional information sent from the unauthorized machine 140. The additional information may be used by security authority 110 to identify the unauthorized user of unauthorized machine 140 and the location of unauthorized machine 140. The method 200 may then proceed to step 260, where the method 200 ends.

Figure 3:
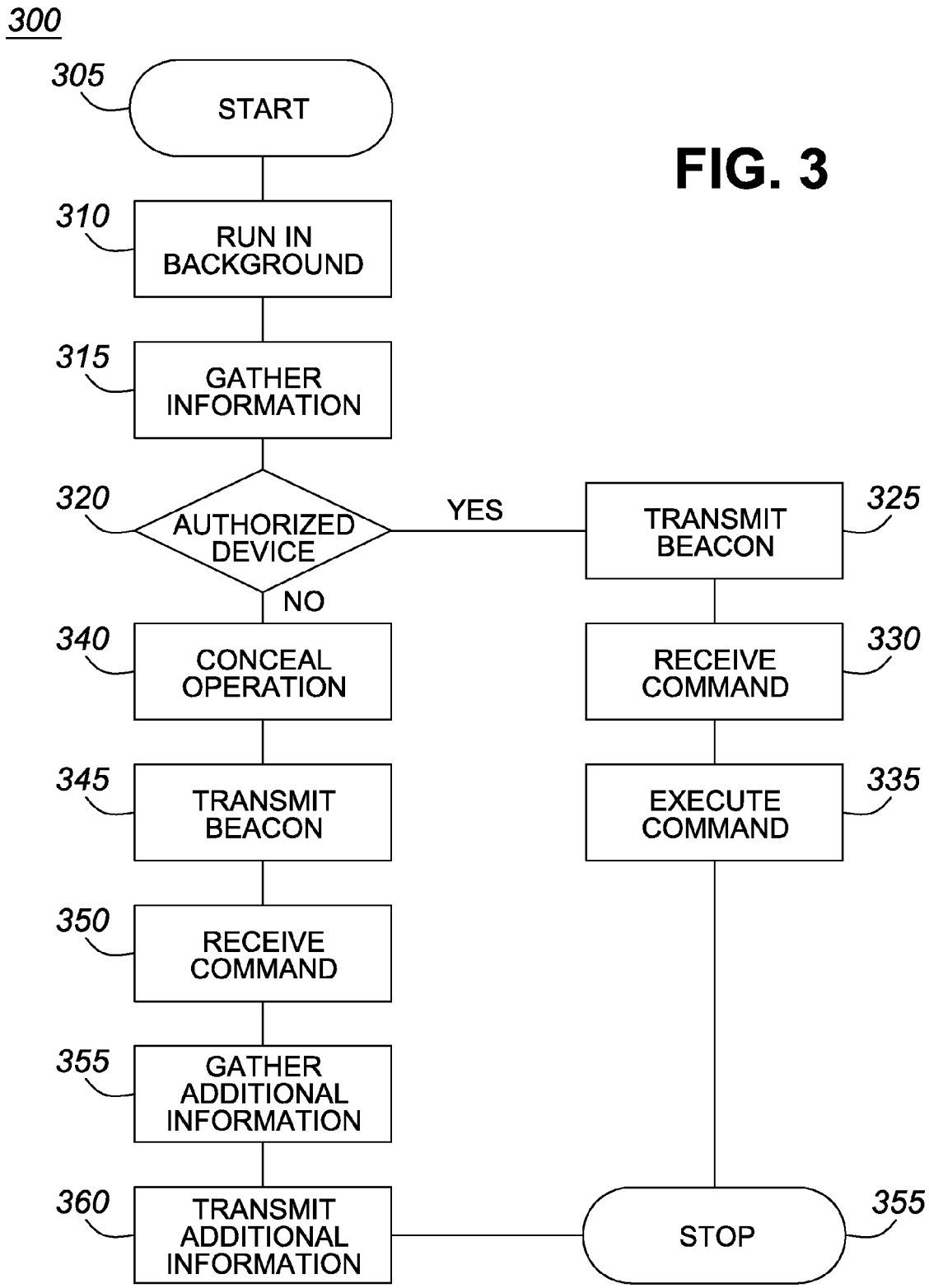
FIG. 3 illustrates a flowchart showing an exemplary method of providing information from a device.

FIG. 3 illustrates a flowchart showing an exemplary method 300 of providing information from a device. Exemplary method 300 may be performed by a device such as authorized machine 120, unauthorized machine 140, or secondary device 150 executing surreptitious code 135. Accordingly, surreptitious code 135 may include instructions for performing the steps of method 300. Method 300 may begin at step 305 and proceed to step 310.

In step 310, the device may execute the surreptitious code 135 in the background. Accordingly, the device may perform operations that are not visible to a user of the device. Execution may be triggered by access to the data file including the surreptitious code.

In step 315, the surreptitious code may gather information about the executing device and the user of the executing device. The information may include identifying data. The surreptitious code may gather one or more of the following identifying data items about the executing device: IP address, telephone number, international mobile subscriber identifier (IMSI), email address, MAC address, wireless identifier or another identifier associated with the unauthorized machine 140. Identifying data for a user may include one or more of signals broadcast from wireless devices in the vicinity of the unauthorized machine 140, pictures taken by a camera of unauthorized machine 140 during use, voice samples taken from a microphone of unauthorized machine 140, fingerprints or other biometric data taken from an access machine of unauthorized machine 140, or any other characteristic of the user accessible to unauthorized machine 140.

The surreptitious code 135 may also turn itself off, or send only limited identifying information in the event that it finds certain "red flag" information on the executing device. The surreptitious code may include exceptions for red flag information that are defined by criteria of the collected information. Surreptitious code may compare the collected information with the exception criteria before transmitting any information. Red flags might include indications that the executing device is located in a particular country or is being used by or contains information about citizens of a particular country, that the device contains lawyer-client or other privileged information, or that the device is owned by a third party that is unaware the device is being used to open and or/transmit protected files in a fashion that violates another party's network security.

In step 320 the surreptitious code 135 compares the executing device on which the file has been opened to a set of parameters established or chosen by the security authority to identify authorized users or environments. If the device opening the file matches these parameters, the device may be an authorized machine and method 300 may proceed to step 325. If the machine opening the file does not match the parameters, the device may be an unauthorized machine and the method 300 may proceed to step 340.

In step 325, surreptitious code may be set to take no action or it may be set to send signals to a machine that records the time, environment and user for purposes of maintaining an audit log of all circumstances in which a file is opened. If the surreptitious code is set to take no action, the method 300 may proceed directly to step 365, where the method ends. If the surreptitious code is set to transmit information, the, surreptitious code may generate a beacon to be transmitted by the executing device. Because the executing device is an authorized machine, the executing device may allow surreptitious code to openly transmit the beacon directly to the security authority 110 or another machine maintaining security logs. Alternatively, surreptitious code 135 may surreptitiously transmit the beacon as described below regarding step 345. The method 300 may proceed to step 330.

In step 330, the executing device may receive a command 180 from the security authority 110. The command 180 may be in response to the security authority 180 receiving the beacon. In step 335, the executing device may perform instructions included in the command 181. For example, the executing device may disable or temporarily disable the surreptitious code to prevent it from sending additional beacons. The executing device may perform any other commands received from the security authority. The method 300 may then proceed to step 365, where the method ends.

In step 340, the surreptitious code may have determined that it is executing on an unauthorized machine 140. Accordingly, surreptitious code 135 may attempt to conceal the operation of the surreptitious code from a user, operating system, or security system of the unauthorized machine 140. In order to maintain an ability to meet security goals, the code may modify other code on the unauthorized machine, including program, operating system, hypervisor, or BIOS code, in a fashion that conceals or disguises the code and its operation from the unauthorized user. Concealment may include specific methods such as renaming files, avoiding operating system audits, and using multiple, mutually supporting programs such that deletion of one program triggers a second or third program that can continue to perform the security functions. Other mechanisms may include modification of the application's code with the consent of the licensor of the application for purposes of supporting the security system. The surreptitious code may operate in such a way as to minimize harm to the unauthorized user's machine.

In step 345, the surreptitious code may surreptitiously transmit beacon 165 from the executing unauthorized machine 140. The beacon 165 may include at least some of the gathered information. The surreptitious code 135 may cause the unauthorized machine 140 to surreptitiously send a signal or beacon to a representative of the security authority via any available network or device. Examples of available networks include the Internet, wireless networks, or any other network by which the machine is able to communicate. This signal may be sent or attempted to be sent as many times over as long a period as is deemed necessary by security authority 110. Rules for how and when to transmit the beacon may be included with surreptitious code 135. In various embodiments, surreptitious code may repeatedly send the signal until a response from the security authority is received.

Whether and when to collect and transmit identifying data may be varied depending on the legal status of the collection, the risk associated with gathering the information at a particular stage, and the technical difficulties of collecting and transmitting the information. In some cases, the transmission of signals containing more than a minimum of identifying data collection may be postponed or divided among several transmissions that must be reassembled by the security authority. The delay or division of the signals may be written into the surreptitious code before it is incorporated into the data file or it may be an option triggered by a later message transmitted by the security authority. Collection and transmission of more detailed identifying information may be delayed for any time period. A delay may occur before or after receipt of a first beacon signal and transmission of a command 180 from the security authority 110. Sending additional information after a delay may be useful in cases where the security authority is unable to send commands to the unauthorized machine 140. For example, unauthorized machine 160 may block incoming data transmissions.

The surreptitious code may surreptitiously transmit the beacon by for example modifying communications 160 sent by the unauthorized machine 140 so that the identifying information is incorporated into some or all of the files stored or transmitted by the unauthorized machine's user as the user goes about its intended activities on a network. If necessary, the surreptitious code may modify communications 160 over a long time period to avoid detection during transmission. The beacon may be hidden in data sent by the unauthorized machine in the ordinary course of that machine's other activities, such as by varying the format or other data associated with documents, spreadsheets, presentations, pictures, videos, or communications protocols, or by injecting the beacon into fields of packets that otherwise contain arbitrary, random, or redundant data. The signals may be hidden in a fashion that makes it more difficult for the unauthorized machine and its user to identify the operation of the beaconing signal, even if the user is monitoring activity of the machine and its transmissions to the network. For example, the beacon signal may be disguised as a query sent to a common search or DNS server or another communication, making it unlikely that the beacon will be identified as unusual by human or machine monitors of outgoing connections.

If there is no live network connection at the time the surreptitious code gathers the identifying data for the beacon, transmission of the beacon signal may be delayed until such a connection is available. In various embodiments, the surreptitious code may attach the identifying data along with a copy of the surreptitious code to files sent from the unauthorized machine 140 to other parties. When those files are opened on the other parties' machines, e.g. secondary device 150, the surreptitious code executes and performs security functions including transmitting the beacon. In various embodiments, the surreptitious code may install the beacon signal and supporting surreptitious code on any portable media attached to or modified by the unauthorized machine 140 including flash drives, compact disks of all kinds, and music and video players. The supporting surreptitious code may install itself and copy the beacon signal onto any other machine that is given access to the portable media, secondary device 150 for example, and then transmit the beacon signal from the new machine or machines. When surreptitious code executes on a secondary device 150, the beacon 165 may include identifying data for all parties in the chain of communication from unauthorized machine 140.

In step 350, unauthorized machine 140 may receive a command 180 from security authority 110. The command 180 may arrive directly from security 110 or via an intermediary machine such as, for example, receiving devices 170. The surreptitious code 135 may include instructions for receiving the command 180 on the unauthorized machine 140. For example, surreptitious code 135 may include instructions for authenticating the command 180 as originating from an authorized command authority. Surreptitious code 135 may include a public key corresponding to a private key held by an authorized command authority. Surreptitious code 135 may use the public key to authenticate a signature on the command 180. If surreptitious code 135 cannot authenticate the command 180, surreptitious code may refrain from performing instructions included in the command 180. This may minimize harm caused by surreptitious code 135 and prevent illegal or unauthorized use of the surreptitious code 135. The method 300 may proceed to step 355.

In step 355, the surreptitious code 135 may perform instructions included in command 180. Alternatively, surreptitious code 135 may perform additional instructions based on a timer or other condition detected by surreptitious code 135. For example, the surreptitious code 135 may gather additional information about the unauthorized machine 140 or the user of the machine. Surreptitious code 135 may use any of the methods described above regarding step 315 for gathering additional information. Gathering additional information may include gathering information that had been delayed due to risk of detection, unavailability, privacy concerns, or any other reason. Other exemplary commands that may be performed on unauthorized machine 140 may include temporarily or permanently disabling the surreptitious code, changing the method of transmitting data, deleting data, and installing additional code on unauthorized machine 140. A command to uninstall the surreptitious code may surreptitiously uninstall the code, leaving little or no trace of its past activity on the executing machine.

In step 360, the surreptitious code 135 may transmit additional information from unauthorized machine 140. Surreptitious code 135 may use any of the techniques described above regarding step 345 for transmitting the additional information. The method 300 may proceed to step 365, where the method ends.

Figure 4:
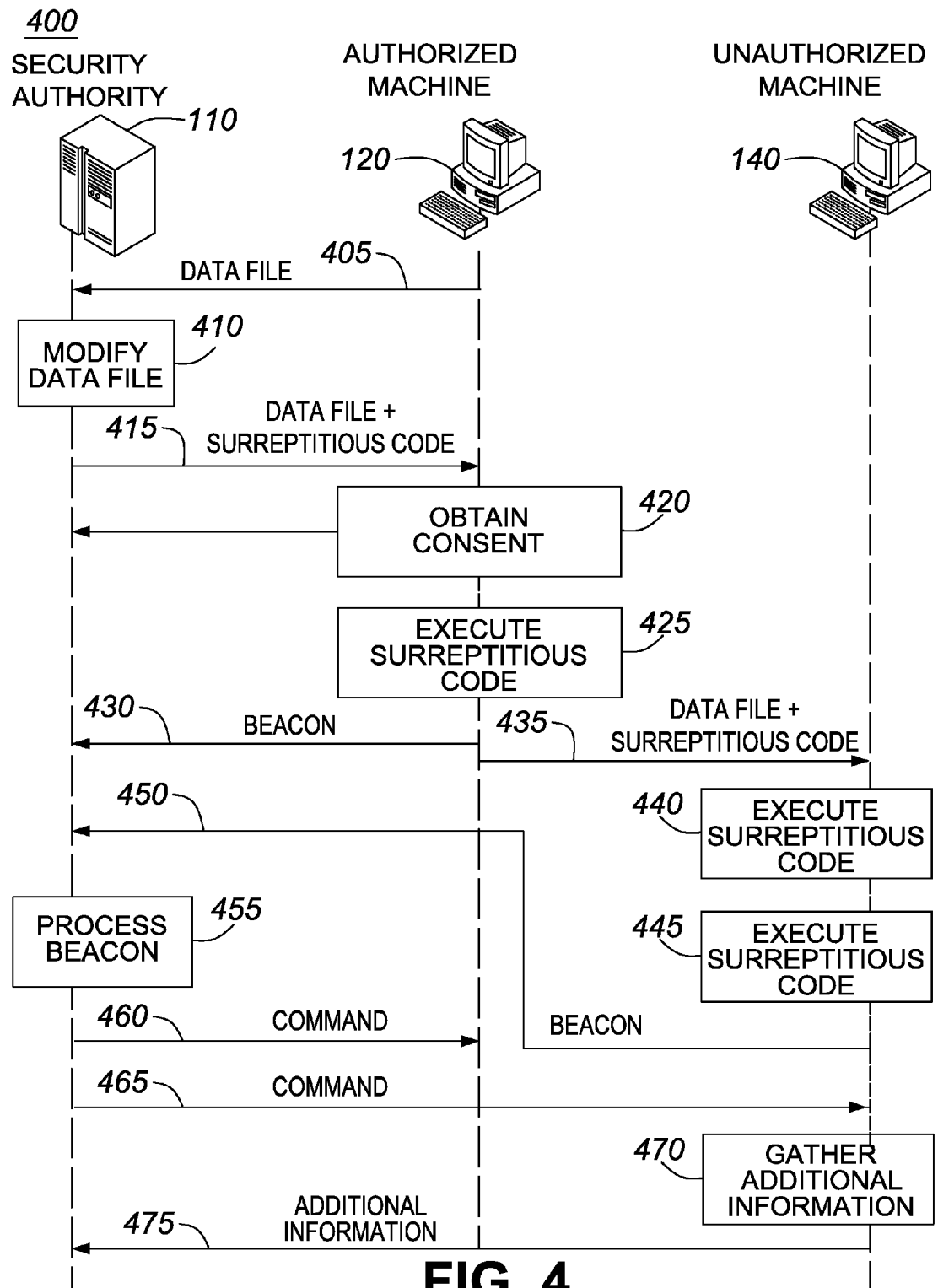
FIG. 4 illustrates a message diagram showing messages sent within a computing environment.

FIG. 4 illustrates a message diagram showing messages sent within a computing environment 100. In particular, messages may be sent between security authority 110, authorized machine 120, and unauthorized machine 140. As described above, surreptitious code 135 executing on unauthorized machine 140 may hide beacons within intended communications of unauthorized machine 140 or copy itself to a secondary device 150 in order to send messages. Security authority may receive messages sent from unauthorized machine 140 via a secondary device 150 and/or receiving machines 170. In FIG. 4, a message may be illustrated by a horizontal arrow. It should be apparent that a message may indicate both a step of sending the message and a step of receiving the message.

In step 405, authorized machine 120 may send a data file 130 to security authority 110 for protection. In step 410, which may correspond to step 210 described above, security authority 110 may modify the data file 130 by embedding the surreptitious code 135 within the data file 130. In step 415, security authority 110 may return the data file 130 including surreptitious code 135 to authorized machine 120.

In step 420, which may correspond to step 215 described above, authorized machine 120 may request consent from the user and forward the consent to security authority 110, which may log the consent for future reference.

In step 425, the authorized machine 120 may execute the surreptitious code 135. Execution may be triggered by the authorized machine 120 accessing a data file 130 including the surreptitious code 135. In step 430, the surreptitious code 135 executing on the authorized machine 120 may generate a beacon 165 and send the beacon to security authority 110. Authorized machine 120 may be aware of the surreptitious code 135 and the beacon 165 may be sent in the open. For example, authorized machine 120 may allow an open port to be used by surreptitious code 135 for sending beacons.

In step 435, the data file 130 and surreptitious code 135 may be transferred to unauthorized machine 140. The transfer may occur in a variety of ways. For example, the authorized user may make a copy of the data file 130 on the unauthorized machine 140 using a network or removable media. As another example, the authorized machine 120 may be physically removed from a secure location and become an unauthorized machine 140. In any case, the surreptitious code 135 may be transferred along with the data file 130.

In step 440, the unauthorized machine 140 may execute the surreptitious code while attempting to access the data file 130. The surreptitious code may include instructions that gather information about the unauthorized machine 140 and/or an unauthorized user. In step 445, when the surreptitious code 135 determines that it is executing on an unauthorized machine 140, the surreptitious code 135 may attempt to conceal the surreptitious code as described above regarding step 340.

In step 450, which may correspond to step 345 described above, the unauthorized machine 140 may transmit a beacon 165 including at least some of the gathered information. The beacon 165 sent in step 450 may differ from the beacon sent in step 430 because in step 450, the surreptitious code may surreptitiously transmit the beacon from the unauthorized machine to prevent a user, operating system, or security system from detecting the beacon.

In step 455, which may correspond to steps 220 and 225 described above, the security authority 110 may process the received beacon. Security authority 110 may generate different responses based on the content and source of the received beacon. In step 460, which may correspond to step 235, security authority 110 may send a command 180 to authorized machine 120. In step 465, which may correspond to step 245 described above, security authority 110 may send a command 180 to unauthorized machine 140.

In step 470, which may correspond to step 355, unauthorized machine 140 may gather additional information. In step 475, which may correspond to step 360, unauthorized machine 140 may transmit additional information to security authority 110. The method 400 may end, or continue transmitting commands and additional information.

According to the foregoing, various exemplary embodiments provide for a computer security mechanism for securing data files. In particular, by embedding surreptitious code within a data file, the data file may be tracked across both authorized and unauthorized machines.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method, comprising:
    identifying unauthorized access to a data file on a computerized machine:
    modifying the data file to include surreptitious code, the surreptitious code executing on the computerized machine when the data file is opened or otherwise used on the computerized machine;
    providing the modified data file to an authorized machine; and
    receiving information transmitted by the surreptitious code,
    wherein the surreptitious code comprises instructions for:
        gathering information about the computerized machine,
        determining whether the computerized machine is an unauthorized machine,
        concealing or protecting copies or versions of the surreptitious code on the unauthorized machine, and
        surreptitiously transmitting the information if the computerized machine is an unauthorized machine,
    wherein the instructions for concealing or protecting copies or versions of the surreptitious code comprise at least one of: instructions for renaming files; instructions for avoiding operating system audits; instructions for using existing code already installed on the unauthorized machine to carry out some or all of the functions of the surreptitious code; and instructions for generating multiple mutually supporting programs such that the deletion of one program triggers an additional program that continues to perform the security functions of the surreptitious code.

2. The method of claim 1, wherein the instructions for gathering information comprise at least one of: instructions for intercepting signals broadcast by a wireless device in the vicinity of the computerized machine; instructions for taking a picture using a camera of the computerized machine; instructions for taking a voice sample using a microphone of the computerized machine; and instructions for copying a digital fingerprint used to access the computerized machine.

3. The method of claim 1, wherein the surreptitious code further comprises instructions for openly transmitting the information if the computerized machine is an authorized machine.

4. The method of claim 1, wherein the instructions for determining whether the data file is on an unauthorized machine comprise instructions for comparing the gathered information to a set of parameters identifying authorized users.

5. The method of claim 1, further comprising determining parameters defining authorized users of the data file and including the parameters within the surreptitious code.

6. The method of claim 1, further comprising obtaining a consent of a user of the data file to access and modify data on any machine accessing the data file.

7. The method of claim 1, further comprising determining, based on the received information, whether the computerized machine is authorized to access the data file.

8. The method of claim 1, further comprising sending a command to the computerized machine, wherein the surreptitious code includes instructions for receiving the command and executing the command on the computerized machine.

9. The method of claim 8, wherein the command comprises instructions for disabling or suspending operation of the surreptitious code temporarily or permanently.

10. The method of claim 8, wherein the instructions for receiving the command include instructions for analyzing a unique credential that authenticates the command as sent from an authorized command authority.

11. The method of claim 10, wherein the authorized command authority is one of: the management of a security authority, a government agency, and a court.

12. The method of claim 1, wherein the instructions for transmitting the information comprise instructions for including the information in a query sent to a search engine or Domain Name System (DNS) server.

13. The method of claim 1, wherein the instructions for transmitting the information comprise instructions for modifying a communication of the computerized machine to include the information.

14. The method of claim 1, wherein the instructions for transmitting the information comprise instructions for copying the information and surreptitious code to a secondary device.

15. The method of claim 1, wherein the instructions for gathering information comprise: determining whether collected information satisfies conditions for an exception, and excluding the collected information from the transmitted information if it satisfies the conditions.

16. The method of claim 1, wherein the surreptitious code includes a unique credential that identifies an instance of the surreptitious code included in the data file and the surreptitious code further comprising instructions for transmitting the unique credential.

17. A non-transitory machine-readable storage medium encoded with instructions executable by a processor, the non-transitory machine-readable storage medium comprising:
instructions for identifying unauthorized access to a data file on a machine;
instructions for modifying a data file to include surreptitious code, the surreptitious code executing on a machine comprising the processor when the data file is opened or otherwise used, the surreptitious code comprising instructions for:
gathering information about the machine,
determining whether the data file is on an unauthorized machine,
concealing or protecting copies or versions of the surreptitious code on the unauthorized machine, and
surreptitiously transmitting the information if the machine is an unauthorized machine;
instructions for providing the modified data file to an authorized machine; and
instructions for receiving the information transmitted by the surreptitious code,
wherein the instructions for concealing or protecting copies or versions of the surreptitious code comprise at least one of: instructions for renaming files; instructions for avoiding operating system audits; instructions for using existing code already installed on the unauthorized machine to carry out some or all of the functions of the surreptitious code; and instructions for generating multiple mutually supporting programs such that the deletion of one program triggers an additional program that continues to perform the security functions of the surreptitious code.

18. A system, comprising:
a first computer component to identify unauthorized access to a data file on a machine;
a second computer component to modify a data file to include surreptitious code, the surreptitious code executing when the data file is opened or otherwise used, the surreptitious code comprising instructions for:
gathering information about the machine;
determining whether the data file is on an unauthorized machine;
concealing or protecting copies or versions of the surreptitious code on the unauthorized machine; and
surreptitiously transmitting the information if the machine is an unauthorized machine; and
receiving the information transmitted by the surreptitious code,
wherein the instructions for concealing or protecting copies or versions of the surreptitious code comprise at least one of: instructions for renaming files; instructions for avoiding operating system audits; instructions for using existing code already installed on the unauthorized machine to carry out some or all of the functions of the surreptitious code; and instructions for generating multiple mutually supporting programs such that the deletion of one program triggers an additional program that continues to perform the security functions of the surreptitious code.

* * * * *